Oct. 29, 1968   F. H. L. HUPPMANN   3,407,722
APPARATUS FOR THE CONTINUOUS FERMENTATION AND CURING OF BEER
Filed Aug. 12, 1966   3 Sheets-Sheet 3
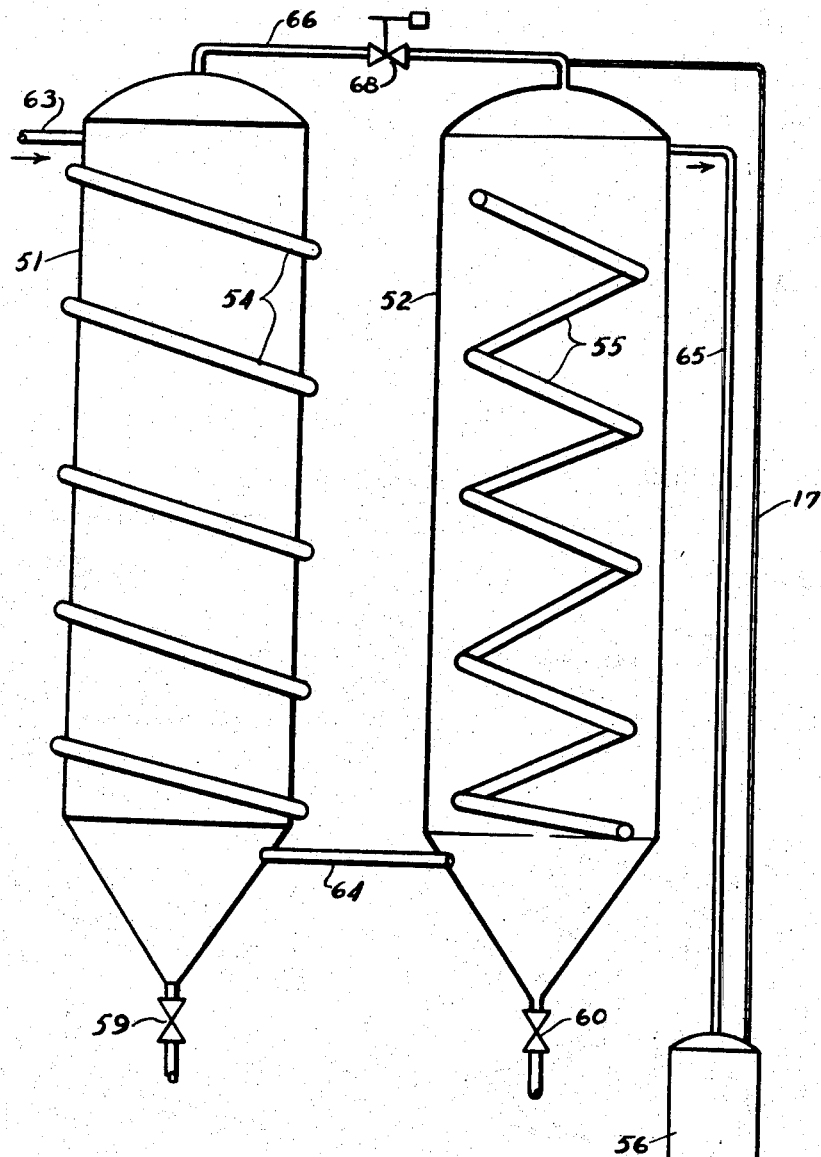
FIG.3
FIG.4
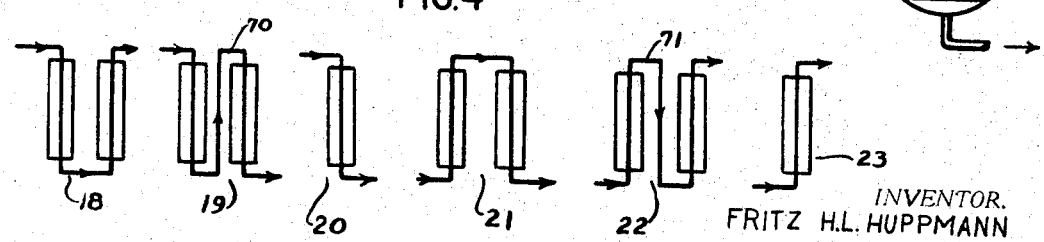
INVENTOR.
FRITZ H.L. HUPPMANN
BY James and Franklin
ATTORNEYS

United States Patent Office 3,407,722
Patented Oct. 29, 1968

3,407,722
APPARATUS FOR THE CONTINUOUS FERMENTATION AND CURING OF BEER
Fritz H. L. Huppmann, 88 Eckerkamp,
2 Hamburg 64, Germany
Filed Aug. 12, 1966, Ser. No. 572,019
15 Claims. (Cl. 99—277.1)

ABSTRACT OF THE DISCLOSURE

This apparatus is for the continuous secondary fermentation and curing of beer and it comprises two tall upright columns having a height of the order of say seven meters. There is a pipe connection to supply green beer to the top of the first column; a connection from a point near the bottom of the first column to a corresponding point near the bottom of the second column for flow from the first to the second column; and a connection near the top of the second column for discharge of the cured beer. The columns are so tall that there is a substantial increase of pressure in descending direction in the first column to help accelerate the precipitation of yeast and sediment and to increase the absorption of carbon dioxide gas. There is a corresponding reduction of pressure in ascending direction in the second column which accelerates the release of carbon dioxide gas to help wash the beer in the second column. A pressure regulator may be connected to the tops of the columns to maintain a pressure of the order of say three meters of water column, in which case the pressure at the bottom of the columns is of the order of say ten meters of water column. The pressure regulator also serves for discharge of carbon dioxide released in the columns. The lower end of each column is preferably an inverted cone in which precipitated yeast and sediment may collect for removal by means of a valve. The connection from the first to the second column is just above the conical bottom. An additional horizontal vat preferably is disposed in and forms a part of the connection between the first and second column, and a motor-driven conveyor disposed along the bottom of the horizontal vat leads to a drain pipe and valve for removal of sediment collected in the horizontal vat.

---

This invention relates to the brewing of beer, and more particularly to an apparatus for that purpose.

In my application Ser. No. 669,090 filed Sept. 20, 1967, I disclose a fully continuous process for the preparation of beer. All steps of the brewing and fermenting process are carried out continuously. For the further development of this process there is disclosed in the present application a process whereby the after-fermentation, storing and curing of the beer also are carried out continuously.

Although a continuous process for storage and curing is already known, it was not satisfactory. The known process uses horizontally placed containers through which the beer passes. In the passage through the horizontally placed containers, however, the yeast and lees deposit on the bottom of the container.

The containers must therefore be cleaned frequently, for which purpose the production must be interrupted. Due to the horizontal arrangement of the containers, the pressure within such a container is substantially constant. This constant pressure, however, is not favorable for rapid curing.

For a rapid curing process the so-called descending pressure bulkheading, i.e. a decrease of the pressure in the course of the storage or curing process, is particularly advantageous. At the higher pressure a relatively great quantity of the carbon dioxide formed in the course of fermentation is absorbed. As the pressure decreases, the carbon dioxide escapes and rises to the surface, and a washing of the beer takes place. This idea has been utilized in still storage, in that the pressure was allowed to increase during the after-fermentation, causing a release of carbon dioxide just before the discharge by settling. The liberated carbon dioxide then washes the undesirable flavor substances out of the beer.

Also the use of relatively high vertical tanks in still storage is known. A disadvantage here, however, is the different intensity of carbon dioxide binding due to different liquid pressure. Moreover, due to the long settling path, which the precipitating yeast and dreg particles must transverse, an insufficient clarification of the beer is achieved.

One object of the present invention is to provide a process for continuous storage and curing of beer, wherein the advantages of descending pressure bulkheading are combined with the advantages of a continuous process.

In my process for the continuous production of beer the after-fermentation, storage and curing are carried out continuously, the beer traversing several containers connected in series. According to the invention an ascending or descending flow is maintained, and the pressures increase or decrease along the path of flow. In the case of descending flow, which is advantageously used where the greatest precipitation of yeast and dreg particles takes place, the yeast particles must, on the one hand, travel a long settling path through older beer layers, and in so doing perform their fermenting activity longer. On the other hand, due to agglutination an enlargement of yeast and dreg particles takes place, and the flow in descending direction causes an acceleration of the settling rate, so that despite longer fermenting activity a faster clarification occurs.

In one example of my process the pressure which the beer is under during its passage is first raised along this path in a first container from, for example, a pressure of three-meter water column to ten-meter water column, and then is reduced again in a second tank from, say a ten-meter water column to a three-meter water column. The pressure values are given as an example, but I may also use greater pressure differences. At the higher pressure, say ten-meter water column, a considerable quantity of the carbon dioxide formed during fermentation is absorbed by the beer. At the lower pressure of three meter water column, the carbon dioxide escapes and rises upward through the beer. An intensive washing of the beer to eliminate undesirable flavor substances therefore takes place.

The process can be carried out so that in a first container (or first battery of containers) the after-fermentation takes place, and in a second container (or a second battery of containers) curing of the beer takes place. It has proved advantageous to produce a descending flow in the first battery of containers, and an ascending flow in the second battery of containers. This is particularly advantageous for the reason that during the after-fermentation there still is considerable precipitation of yeast and dregs. The settling of these precipitating particles brings about with the proposed direction of flow in the first column a faster fermentation and clarification. In the second column, in which an ascending flow takes place, the pressure decreases in the course of the flow, carbon dioxide issuing and bubbling through the liquid to the top, and thus causing an effective washing of the beer. Because of the ascending direction of flow it is always the clearest beer that is drawn off.

It has has proved advantageous further to connect between the two upright containers (or batteries of containers) one or more horizontal containers.

To prevent a mixing of the beer and to achieve a good stratification, the beer temperature is preferably varied in the course of after-fermentation according to the variation of the specific gravity of the beer.

In the apparatus according to the invention for carrying out the process described, the containers have vertical walls, preferably in the form of an upright cylinder or column.

In an advantageous form of construction the containers are designed so high (for example seven meters) that the difference pressure (for example seven-meter water column) between the lowest pressure occurring in the course of the process (for example three-meter water column) and the highest pressure (for example ten-meter water column) is produced by the weight of the liquid column itself. To receive the depositing yeast and dregs, the containers are designed conically at the bottom, with an opening at the bottom tip of the cone for drawing off the sediment. However the tapping points leading to the next container are arranged above the highest possible level of the sediment.

Between the two containers (or batteries of containers) a horizontally placed container may be connected. This horizontal container is preferably provided with a discharge device for removing the sediment. This discharge device may for example be a horizontally placed conveyor worm.

The containers may be connected together at the top by a pipeline. With this connecting line the same pressure is maintained in all containers. In the connecting line a pressure regulator preferably is installed, through which the evolving carbon dioxide is let off accordingly.

For the cooling of the beer, cooling coils may be provided either inside or outside the containers. These cooling coils cool the beer in the course of the after-fermentation to about 0 to −1 degree C., and the beer is maintained at this temperature in the second battery of containers during the curing.

To accomplish the foregoing objects and others which may hereinafter appear, my invention resides in the process and apparatus elements and their relation one to another as I hereinafter describe in the following specification. The specification is accompanied by drawings in which:

FIG. 3 shows one possible arrangement of the cooling coils; and

FIG. 4 is a schematic representation of the various possible directions of flow.

Figure 1:
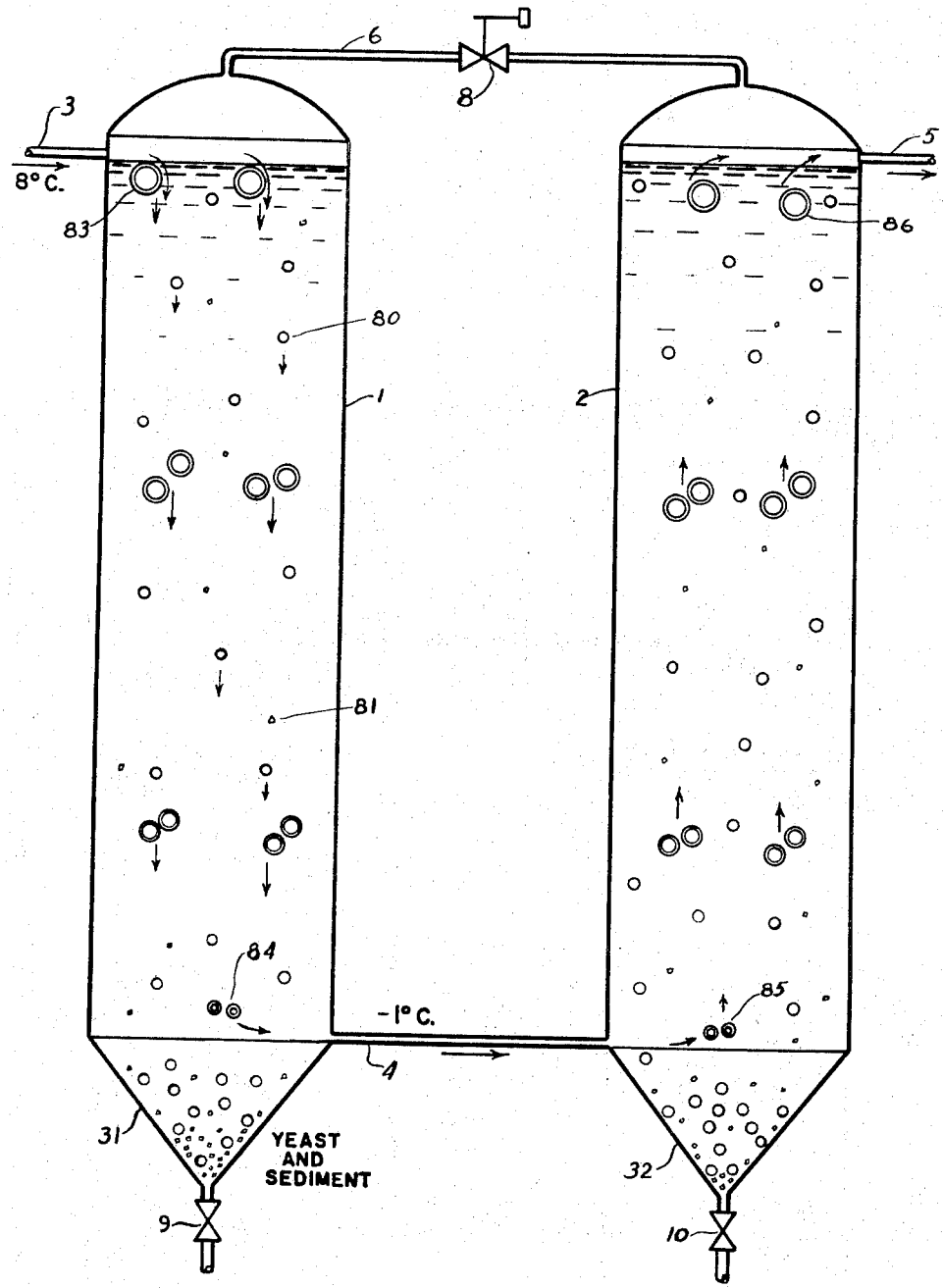
FIG. 1 is a schematic representation of an apparatus consisting of two containers.

Referring to FIG. 1, the apparatus consists of the two vertical cylinders 1 and 2. These containers are conical at the bottom (as shown at 31 and 32). At the upper end of container 1 a feed line 3 enters, while near the lower end of container 1 a connecting line 4 branches off, which again enters in the lower portion of container 2. At the upper end of container 2 a discharge line 5 is connected. The upper ends of containers 1 and 2 are connected together by a connecting line 6. In line 6 a pressure regulator 8 is installed, by which the pressure above the liquid level is maintained constant at a desired value, say three meters of water column. At the lower ends of the conical container parts 31 and 32, valves 9 and 10 are provided for removal of the sediment at intervals.

Figure 2:
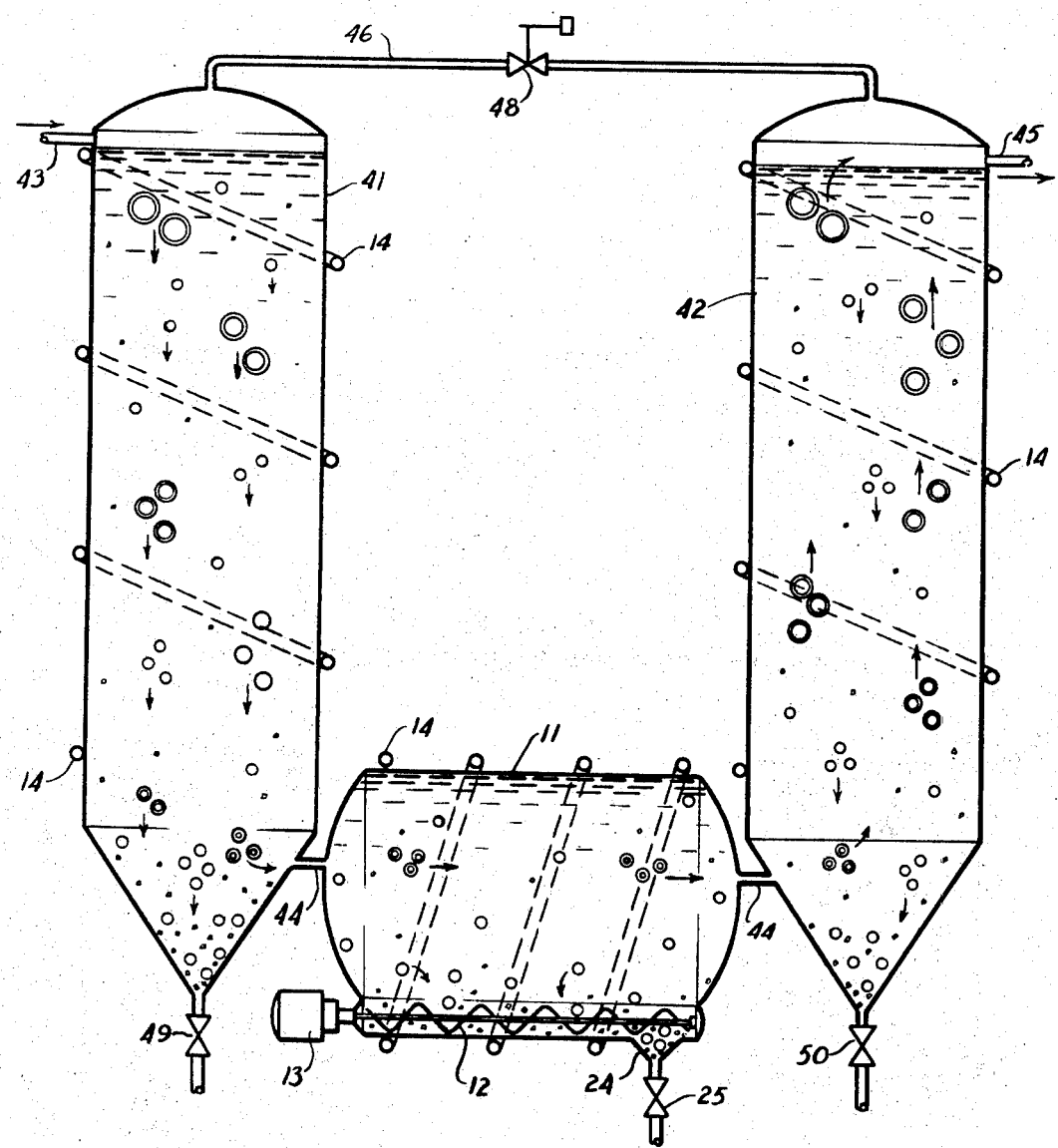
FIG. 2 shows an apparatus consisting of two vertical containers and an interconnected horizontal container.

In the example shown in FIG. 2 a third container 11 in addition to the upright containers 41 and 42 is connected in the connecting line 44. On the underside of container 11 there is a conveyor worm 12 which is driven by a gear motor 13. On the outside walls of containers 41 and 42 and 11 there are further provided cooling coils 14.

Pipes 45 and 46 and pressure regulator 48 correspond to the parts 5, 6 and 8 in FIG. 1.

In the example shown in FIG. 3, the left container 51 is provided with external cooling coils 54, while the right container 52 has internal cooling coils 55. In addition, a tapping container 56 is indicated in FIG. 3. This container follows the discharge pipe 65 and communicates through a pipe 17 with line 66. The pressure regulator is shown at 68 in connecting pipe 66. There thus prevails the same pressure in containers 51, 52 and 56, at least above the liquid level. Container 56 serves as catch and buffer vessel of the beer being dispensed.

In FIG. 4 the various possibilities of flow direction are indicated. In the example marked 18 there is a downward flow in the first container (or battery of containers), and an upward flow in the second container (or battery of containers). In the example marked 19 there occurs first a downward flow, thereupon the beer is conveyed upward in a line 70 and again flows downward in the second container. At 20 only a downward flow is provided. At 21 the beer flows upward in the first container, and downward in the second container. At 22 an upward flow takes place in the first container, then the beer is passed downward through a line 71, and again flows upward in the second container. At 23 only an upward flow takes place. It is possible also to connect three vertical containers in series in counter-current.

The apparatus operates as follows:

Through the inflow line 3 (FIG. 1) so-called green beer comes in, that is, beer which has already undergone the main fermentation. In container 1, at the upper end, a pressure of about 3 meters water column is maintained. This pressure is introduced through line 6. In container 1 a downward flow now occurs, the beer being cooled from an entrance temperature of about 4 degrees C. at the top to about −1 degree C. at the bottom. In the course of the downward movement yeast 80 and dregs 81 precipitate, and sink to the bottom. Settling is favored by the direction of flow. The yeast and dregs deposit in the conical portion 31, where they are drawn off downward from time to time through the valve 9. During passage through the container 1, the static pressure within the liquid increases, because the liquid present above the particular point adds to the pressure. The carbon dioxide still evolving in the course of after-fermentation therefore is increasingly absorbed by the liquid. This is indicated by the large $CO_2$ bubbles 83 present at the top, which become smaller in the course of the downward movement as shown at 84.

Above the sediment at 31 consisting of precipitating yeast and precipitating dregs, the beer is passed through the connecting line 4 into the container 2, in which an upward flow now occurs. The static pressure within the liquid then decreases toward the top. As is indicated by the bubbles 85 becoming larger in upward direction at 86, the liquid can no longer bind the carbon dioxide as the pressure decreases, so that it bubbles out of the liquid and rises to the top through the liquid. In this way a further purification and clarification of the beer is achieved. The carbon dioxide then escapes through the pressure regulator 8. Also in container 2 some dregs and yeast precipitates, which in this container sinks to the bottom 32 counter to the direction of flow, and is drawn off from time to time through the valve 10.

In the arrangement shown in FIG. 2, the container 11 is inserted in the crossflow line 44, in which an additional precipitation of dregs and yeast takes place, which is conveyed intermittently or continuously by means of the motor driven conveyor worm 12 into a discharge sump 24, and is there drawn off through an outflow or drain valve 25. For the rest of the system the function is exactly the same as in the installation shown in FIG. 1. The cooling from the entrance temperature of 4 degrees C. at the top to −1 degree C. at the bottom of column 41 is accomplished by the cooling coil 14. There are similar coils for column 42 and horizontal container 11. Such coils are preferably used in FIG. 1 also, though not there shown.

FIG. 3 shows that the cooling coils may be inside any or all of the containers instead of outside.

In FIG. 4 the example marked 18 is preferred, for reasons previously explained.

It is believed that the construction and operation of my improved apparatus, as well as the advantages thereof, will be apparent from the foregoing detailed description. It will also be apparent that while I have shown and described the invention in several preferred forms, changes may be made without departing from the scope of the invention, as sought to be defined in the following claims.

I claim:

1. Apparatus for the continuous secondary fermentation and curing of beer, said apparatus comprising two tall, upright columns, a pipe connection to supply green beer to the top of the first column, a connection from a point near but somewhat above the bottom of the first column to a corresponding point near but somewhat above the bottom of the second column, for flow from the first to the second column, a connection near the top of the second column for the discharge of the cured beer, said columns being so tall that there is a substantial increase of pressure in descending direction in the first column to help accelerate the precipitation of yeast and sediment, with increased absorption of carbon dioxide gas, and there is a corresponding substantial reduction of pressure in ascending direction in the second column which accelerates the release of carbon dioxide gas to help wash the beer in the second column.

2. Apparatus as defined in claim 1 in which the columns have a height of the order of seven meters.

3. Apparatus as defined in claim 2 which further comprises pressure regulator means connected to the tops of the columns and adjusted to maintain a pressure at the top of the columns of the order of three meters of water column, whereby the pressure at the bottom of the columns is of the order of ten meters of water column, said pressure regulator means serving further for the discharge of carbon dioxide released in the columns.

4. Apparatus as defined in claim 3, in which the lower end of each column is in the form of an inverted cone in which precipitated yeast and sediment may collect, and in which there is a drain pipe and valve for removal of the collected yeast and sediment, and in which the said connection for flow from the bottom of the first column to the bottom of the second column is located above the conical bottom and above any yeast and sediment collected therein.

5. Apparatus as defined in claim 4, in which the columns have cooling coils, and in which the temperature of the beer in the first column is lowered by the cooling coils as the beer moves from the top to the bottom of the column.

6. Apparatus as defined in claim 5, in which there is a horizontal vat disposed in and forming a part of the said connection from the bottom of the first column to the bottom of the second column, and in which there is a means at the bottom of the horizontal vat for removal of sediment collected therein.

7. Apparatus as defined in claim 6, in which the means at the bottom of the horizontal vat for removal of sediment collected therein comprises a motor driven conveyor disposed along the bottom of the vat and leading to a drain pipe and valve at the bottom of the vat near the discharge end of the conveyor.

8. Apparatus as defined in claim 1 which further comprises pressure regulator means connected to the tops of the columns and adjusted to maintain a pressure at the top of the columns of the order of three meters of water column, said pressure regulator means serving further for the discharge of carbon dioxide released in the columns.

9. Apparatus as defined in claim 1, in which the lower end of each column is in the form of an inverted cone in which precipitated yeast and sediment may collect, and in which there is a drain pipe and valve for removal of the collected yeast and sediment, and in which the connection for flow from the bottom of the first column to the bottom of the second column is located above the conical bottom and above any yeast and sediment collected therein.

10. Apparatus as defined in claim 1, in which the columns have cooling coils, and in which the temperature of the beer in the first column is lowered by the cooling coils as the beer moves from the top to the bottom of the column.

11. Apparatus as defined in claim 1, in which there is a horizontal vat disposed in and forming a part of the said connection from the bottom of the first column to the bottom of the second column, and in which there is a means at the bottom of the horizontal vat for removal of sediment collected therein.

12. Apparatus as defined in claim 11, in which the means at the bottom of the horizontal vat for removal of sediment collected therein comprises a motor driven conveyor disposed along the bottom of the vat and leading to a drain pipe and valve at the bottom of the vat near the discharge end of the conveyor.

13. Apparatus for the continuous secondary fermentation and curing of beer, wherein the beer passes through a plurality of vats arranged in series, said apparatus comprising two tall vertical column-like vats, and means for flowing the beer at low velocity in vertical direction through said vats, the pressure maintained in the vats being substantially increased in descending direction, and being substantially reduced in ascending direction, by reason of the substantial height of the vats, a horizontal vat arranged in the series connection from the first column to the second column, and a means at the bottom of the horizontal vat for removal of sediment, said means being a motor driven conveyor.

14. Apparatus for the continuous secondary fermentation and curing of beer, said apparatus comprising two tall upright columns, a pipe connection to supply green beer to one end of the first column, a connection from a point near the other end of the first column to a point near one end of the second column, a connection near the other end of the second column for the discharge of the cured beer, a pressure regulator connected to the tops of the columns and adjusted to maintain a low pressure, and serving also for discharge of carbon dioxide released in the columns, a horizontal vat disposed in and forming a part of the connection between the first column and the second column, a motor-driven conveyor disposed along the bottom of the vat at the discharge end of the conveyor for removal of sediment collected thereby, and valve means at the bottom of each column for the removal of sediment.

15. Apparatus for the continuous secondary fermentation and curing of beer, said apparatus comprising two tall upright columns having a height of the order of seven meters, a pipe connection to supply green beer to one end of the first column, a connection from a point near the other end of the first column to a point near one end of the second column, a connection near the other end of the second column for the discharge of the cured beer, a pressure regulator connected to the tops of the columns and adjusted to maintain a pressure of the order of say three meters of water column, whereby the pressure at the bottom of the columns is of the order of said ten meters of water column, said pressure regulator serving also for discharge of carbon dioxide released in the column, and valve means at the bottom of each column for the removal of sediment.

References Cited

UNITED STATES PATENTS

| | | | |
|---|---|---|---|
| 2,117,604 | 5/1938 | Fessler et al. | 99—277.1 X |
| 2,561,072 | 7/1951 | Reich. | 99—30 X |
| 3,061,438 | 10/1962 | Jacobs et al. | 99—29 X |
| 3,071,469 | 1/1963 | Krabbe et al. | 99—277.1 X |
| 3,207,606 | 9/1963 | Williams | 99—276 X |

ROBERT W. JENKINS, *Primary Examiner.*